US012472386B2

(12) United States Patent
Kang et al.

(10) Patent No.: US 12,472,386 B2
(45) Date of Patent: Nov. 18, 2025

(54) ULTRASOUND IMAGE PROCESSING APPARATUS, METHOD, PROGRAM AND SYSTEM

(71) Applicant: GODIUS CO., LTD., Seoul (KR)

(72) Inventors: Dong Hwan Kang, Seoul (KR); Sun Kim, Seoul (KR); Hyun Sook Lee, Seoul (KR); Myung Deok Kim, Seoul (KR)

(73) Assignee: Godius Co., Ltd., Seoul (KR)

( * ) Notice: Subject to any disclaimer, the term of this patent is extended or adjusted under 35 U.S.C. 154(b) by 0 days.

(21) Appl. No.: 18/889,778

(22) Filed: Sep. 19, 2024

(65) Prior Publication Data

US 2025/0090872 A1    Mar. 20, 2025

(30) Foreign Application Priority Data

Sep. 20, 2023  (KR) .......................... 10-2023-0125524

(51) Int. Cl.
*A61B 8/00* (2006.01)
*A61N 7/00* (2006.01)

(52) U.S. Cl.
CPC .................. *A61N 7/00* (2013.01); *A61B 8/54* (2013.01); *A61N 2007/0052* (2013.01)

(58) Field of Classification Search
CPC ........................................................ A61B 8/54
See application file for complete search history.

(56) References Cited

U.S. PATENT DOCUMENTS

| | | | |
|---|---|---|---|
| 2009/0240148 A1 | 9/2009 | Jeong et al. | |
| 2011/0306881 A1* | 12/2011 | Liu | A61B 8/5223 600/439 |
| 2013/0144165 A1* | 6/2013 | Ebbini | G01S 7/52046 600/439 |

(Continued)

FOREIGN PATENT DOCUMENTS

| | | |
|---|---|---|
| CN | 109310400 B | 6/2021 |
| JP | 2008513148 A | 5/2008 |

(Continued)

OTHER PUBLICATIONS

Korean Intellectual Property Office, Notice of Office Action regarding Application No. 10-2024-0136109, Oct. 7, 2024.

(Continued)

*Primary Examiner* — Colin T. Sakamoto
(74) *Attorney, Agent, or Firm* — Leydig, Voit & Mayer Ltd.

(57) ABSTRACT

An ultrasonic treatment and monitoring system includes: an ultrasonic treatment device configured to emit ultrasonic waves to treat a patient; an ultrasound image acquisition device configured to obtain an ultrasound image; and a control device. The control device is configured to: determine that the ultrasonic treatment device is on; based on the ultrasonic treatment device being on, control the ultrasound image acquisition device to acquire a first ultrasound image; determine that the ultrasonic treatment device is off; based on the ultrasonic treatment device being off, control the ultrasound image acquisition device to acquire a second ultrasound image; and cause the first ultrasound image and/or the second ultrasound image to be displayed on a display.

12 Claims, 5 Drawing Sheets

(56) References Cited

U.S. PATENT DOCUMENTS

| | | | | |
|---|---|---|---|---|
| 2015/0011880 A1* | 1/2015 | Kim | ............... | A61N 7/02 |
| | | | | 600/439 |
| 2016/0296767 A1* | 10/2016 | Seki | ............... | A61N 7/02 |
| 2018/0325490 A1* | 11/2018 | Ku | ............... | A61B 8/485 |
| 2019/0142380 A1* | 5/2019 | Emery | ............... | A61B 8/4483 |
| 2020/0254285 A1* | 8/2020 | Jang | ............... | A61B 8/4488 |

FOREIGN PATENT DOCUMENTS

| | | |
|---|---|---|
| JP | 4630127 B2 | 2/2011 |
| JP | 2013248141 A | 12/2013 |
| JP | 2017023498 A | 2/2017 |
| JP | 6473149 B2 | 2/2019 |
| JP | 2022029165 A | 2/2022 |
| KR | 1020120054920 A | 5/2012 |
| KR | 1020140063996 A | 5/2014 |
| KR | 1020140108238 A | 9/2014 |
| KR | 1020170104176 A | 9/2017 |
| KR | 2022097734 A * | 7/2022 |

OTHER PUBLICATIONS

Korean Intellectual Property Office, Notice of Office Action regarding Patent Application No. 10-2023-0125524, Sep. 20, 2023.
Korean Intellectual Property Office, Notice of Allowance regarding Patent Application No. 10-2023-0125524, Jul. 6, 2024.
Taiwanese Patent Office, Notice of Examination Opinion from the Intellectual Property Office of the Ministry of Economic Affairs regarding Patent Application No. 113135330, Feb. 11, 2025.

\* cited by examiner

ULTRASOUND IMAGE PROCESSING APPARATUS, METHOD, PROGRAM AND SYSTEM

CROSS-REFERENCE TO RELATED APPLICATIONS

This application claims benefit to Korean Patent Application No. 10-2023-0125524, filed on Sep. 20, 2023, which is incorporated by reference herein in its entirety.

FIELD

The present disclosure relates to an ultrasound image monitoring device, a method, a program, and a system therefor.

BACKGROUND

Ultrasound refers to waves with a frequency of 20 kHz or higher, and has the property of penetrating water, so it is widely used in the medical field, such as ultrasound diagnostic devices and ultrasound irradiation devices.

An application of ultrasound in the medical field is an ultrasound imaging device that utilizes the penetration and reflection properties of ultrasound. For example, there is a device that visualizes the time and intensity of reflection as ultrasound penetrates the human body and penetrates each organ, thereby obtaining a cross-sectional image of the human body.

In addition, there is a device that burns and removes specific subcutaneous tissues, such as tumors in the skin, or induces degeneration and regeneration of skin tissue by utilizing the heat generated by high intensity focused ultrasound (HIFU).

However, conventional ultrasound image processing devices are not capable of identifying the location where the ultrasound is focused and the process of tumor degeneration during ultrasound irradiation.

SUMMARY

In an exemplary embodiment, the present disclosure provides an ultrasonic treatment and monitoring system includes: an ultrasonic treatment device configured to emit ultrasonic waves to treat a patient; an ultrasound image acquisition device configured to obtain an ultrasound image; and a control device. The control device is configured to: determine that the ultrasonic treatment device is on; based on the ultrasonic treatment device being on, control the ultrasound image acquisition device to acquire a first ultrasound image; determine that the ultrasonic treatment device is off; based on the ultrasonic treatment device being off, control the ultrasound image acquisition device to acquire a second ultrasound image; and cause the first ultrasound image and/or the second ultrasound image to be displayed on a display.

In another exemplary embodiment, the present disclosure provides a method for monitoring an ultrasonic treatment. The method includes: determining, by an ultrasonic treatment and monitoring system, that an ultrasonic treatment device is off; based on the ultrasonic treatment device being on, acquiring, via an ultrasound image acquisition device of the ultrasound treatment and monitoring system, a first ultrasound image; determining, by the ultrasonic treatment and monitoring system, that the ultrasonic treatment device is off; based on the ultrasonic treatment device being off, acquiring, via the ultrasound image acquisition device, a second ultrasound image; and displaying, by the ultrasonic treatment and monitoring system, the first ultrasound image and/or the second ultrasound image on a display.

In yet another exemplary embodiment, the present disclosure provides one or more non-transitory computer-readable mediums having processor-executable instructions stored thereon. The processor-executable instructions, when executed, facilitate performance of the following by an ultrasonic treatment and monitoring system: determining that an ultrasonic treatment device is off; based on the ultrasonic treatment device being on, acquiring, via an ultrasound image acquisition device of the ultrasound treatment and monitoring system, a first ultrasound image; determining that the ultrasonic treatment device is off; based on the ultrasonic treatment device being off, acquiring, via the ultrasound image acquisition device, a second ultrasound image; and displaying the first ultrasound image and/or the second ultrasound image on a display.

BRIEF DESCRIPTION OF THE FIGURES

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
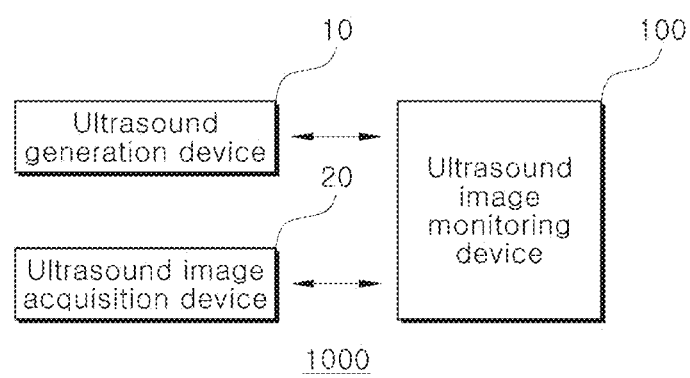
FIG. 1 is a diagram illustrating an example of an ultrasound image monitoring system according to the present disclosure.

Exemplary embodiments of the present disclosure are able to identify the location where ultrasound is focused and the process of tumor degeneration during ultrasound irradiation using an image, and prevent safety accidents through the image identification.

Exemplary embodiments of the present disclosure are further able to identify the process of tumor degeneration using an image while minimizing interference between ultrasounds.

Technical problems addressed by the present disclosure are not limited to the technical problems mentioned above.

In an aspect of the present disclosure, an ultrasound image monitoring device may include a communication unit (e.g., a receiver) configured to perform communication with an ultrasound generation device and an ultrasound image acquisition device; and a processor configured to control operations related to ultrasound image processing, wherein the processor is configured to: based on receiving an ultrasound ON signal from the ultrasound generation device during an ultrasound ON period through the communication unit, receive a first ultrasound image from the ultrasound image acquisition device through the communication unit, based on receiving an ultrasound OFF signal from the ultrasound generation device during an ultrasound OFF period through the communication unit, receive a second ultrasound image from the ultrasound image acquisition device through the communication unit, and display at least one of the first ultrasound image or the second ultrasound image on a display unit.

Furthermore, the first ultrasound image and the second ultrasound image may be identical to each other or different from each other.

Furthermore, the first ultrasound image may be an image of a periphery portion of a target area, and the second ultrasound image may be an image of the target area.

Furthermore, the processor is configured to: based on receiving the ultrasound OFF signal, the second ultrasound image may be separated and received through different scanning lines.

Furthermore, the processor is configured to: based on receiving the ultrasound ON signal, the first ultrasound image may be received simultaneously through the same scanning lines.

Furthermore, in another aspect of the present disclosure, a method for monitoring an ultrasound image performed by an ultrasound image monitoring device may include, based on receiving an ultrasound ON signal from an ultrasound generation device during an ultrasound ON period through a communication unit of the ultrasound image monitoring device, receiving a first ultrasound image from the ultrasound image acquisition device through the communication unit; based on receiving an ultrasound OFF signal from the ultrasound generation device during an ultrasound OFF period through the communication unit, receiving a second ultrasound image from the ultrasound image acquisition device through the communication unit; and controlling a display of the ultrasound image monitoring device to display at least one of the first ultrasound image or the second ultrasound image by a processor of the ultrasound image monitoring device.

Furthermore, receiving the first ultrasound image may include: based on receiving the ultrasound ON signal through the communication unit, receiving the first ultrasound image simultaneously through the same scanning lines.

Furthermore, receiving the first ultrasound image may include: based on receiving the ultrasound OFF signal through the communication unit, receiving the second ultrasound image separately through different scanning lines.

Furthermore, in still another aspect of the present disclosure, a system for monitoring an ultrasound image may include an ultrasound generation device; an ultrasound image acquisition device; and an ultrasound image monitoring device configured to perform communication with the ultrasound generation device and the ultrasound image monitoring device, wherein the ultrasound image monitoring device is configured to: based on receiving an ultrasound ON signal from the ultrasound generation device during an ultrasound ON period, receive a first ultrasound image from the ultrasound image acquisition device, based on receiving an ultrasound OFF signal from the ultrasound generation device during an ultrasound OFF period, receive a second ultrasound image from the ultrasound image acquisition device, and display at least one of the first ultrasound image or the second ultrasound image.

In addition, a computer program stored in a computer-readable recording medium may be further provided to perform a method for monitoring ultrasound image by being combined with a computer as hardware.

In addition, a non-transitory computer-readable recording medium recording a computer program for executing a method for implementing the present disclosure may be further provided.

In the drawings, the same reference numeral refers to the same element. This disclosure does not necessarily describe all elements of embodiments, and general contents in the technical field to which the present disclosure belongs or repeated contents of the embodiments may be omitted. The terms, such as "unit, module, member, and block" may be embodied as hardware or software, and a plurality of "units, modules, members, and blocks" may be implemented as one element, or a unit, a module, a member, or a block may include a plurality of elements.

Throughout this specification, when a part is referred to as being "connected" to another part, this includes "direct connection" and "indirect connection", and the indirect connection may include connection via a wireless communication network. Furthermore, when a certain part "includes" a certain element, other elements are not excluded unless explicitly described otherwise, and other elements may in fact be included.

Furthermore, when a certain part "includes" a certain element, other elements are not excluded unless explicitly described otherwise, and other elements may in fact be included.

In the entire specification of the present disclosure, when any member is located "on" another member, this includes a case in which still another member is present between both members as well as a case in which one member is in contact with another member.

The terms "first," "second," and the like are just to distinguish an element from any other element, and elements are not limited by the terms.

The singular form of the elements may be understood into the plural form unless otherwise specifically stated in the context.

Identification codes in each operation are used not for describing the order of the operations but for convenience of description, and the operations may be implemented differently from the order described unless there is a specific order explicitly described in the context.

Hereinafter, operation principles and embodiments of the present disclosure will be described with reference to the accompanying drawings.

An ultrasound image monitoring device according to the present disclosure in this specification includes various devices that can perform computational processing and provide results to a user. For example, a device according to the present disclosure may include a computer, a server device, and a portable terminal, or may be in the form of one of them.

Here, the computer may include, for example, a notebook, a desktop, a laptop, a tablet PC, a slate PC, and the like mounted with a web browser.

The server device is a server that communicates with an external device to process information, and may include an application server, a computing server, a database server, a file server, a mail server, a proxy server, and a web server.

A portable terminal is a wireless communication device that ensures portability and mobility, and may include all kinds of handheld-based wireless communication devices such as PCS (Personal Communication System), GSM (Global System for Mobile communications), PDC (Personal Digital Cellular), PHS (Personal Handyphone System), PDA (Personal Digital Assistant), IMT (International Mobile Telecommunication)-2000, CDMA (Code Division Multiple Access)-2000, W-CDMA (W-Code Division Multiple Access), WiBro (Wireless Broadband Internet) terminals, smart phones, and the like, and wearable devices such as watches, rings, bracelets, anklets, necklaces, glasses, contact lenses, or head-mounted devices (HMDs).

The ultrasound image monitoring system according to the present disclosure may receive a first ultrasound image from the ultrasound image acquisition device, based on receiving an ultrasound ON signal from the ultrasound generation device during an ultrasound ON period, receive a second ultrasound image from the ultrasound image acquisition device, based on receiving an ultrasound OFF signal from the ultrasound generation device during an ultrasound OFF period, and display at least one of the first ultrasound image or the second ultrasound image.

The ultrasound image monitoring system according to the present disclosure may identify the location where the ultrasound is focused and the process of tumor degeneration during ultrasound irradiation, and prevent safety accidents through the image identification.

Hereinafter, the ultrasound image monitoring system according to the present disclosure will be examined in detail.

Figure 2:
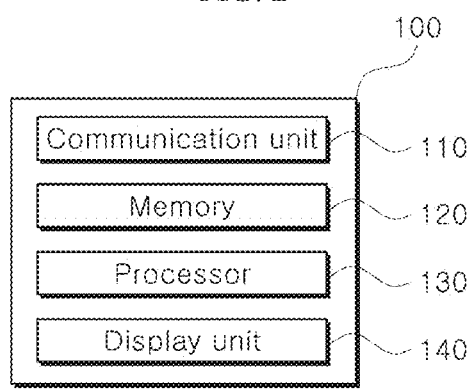
FIG. 2 is a diagram illustrating the configuration of the ultrasound image monitoring device of FIG. 1.

FIG. 1 is a diagram illustrating an example of an ultrasound image monitoring system according to the present disclosure. FIG. 2 is a diagram illustrating the configuration of the ultrasound image monitoring device of FIG. 1.

Referring to FIG. 1 and FIG. 2, the ultrasound image monitoring system 1000 may include an ultrasound generation device 10 (e.g., an ultrasonic treatment device), an ultrasound image acquisition device 20, and an ultrasound image monitoring device 100 (e.g., a control device).

The ultrasound generation device 10 may irradiate ultrasonic wave to a skin or a human body. In this case, the ultrasound generation device 10 may output an ultrasound ON signal that irradiates ultrasound during an ultrasound ON period, and may output an ultrasound OFF signal that does not irradiate ultrasound during an ultrasound OFF period.

The ultrasound image acquisition device 20 may acquire an ultrasound image of the skin or the human body. Here, the ultrasound image acquisition device 20 may be an ultrasound probe. Without being limited thereto, the ultrasound image acquisition device 20 may be any device that may acquire an ultrasound image of the skin or the human body. At this time, the ultrasound image acquisition device 20 may acquire and transmit a first ultrasound image to the ultrasound image monitoring device 100, and acquire and transmit a second ultrasound image to the ultrasound image monitoring device 100. Here, the first ultrasound image and the second ultrasound image may be the same or different from each other. For example, the first ultrasound image may be an image of a periphery portion of a target area being irradiated with ultrasound, and the second ultrasound image may be an image of the target area irradiated with ultrasound.

The ultrasound image monitoring device 100 may include a communication unit 110, a memory 120, a processor 130, and a display unit 140.

The communication unit 110 may perform communication with the ultrasound generation device 10 and the ultrasound image acquisition device 20.

The communication unit 110 may include at least one of a wired communication module and a wireless communication module. The wired communication module may include various wired communication modules such as a Local Area Network (LAN) module, a Wide Area Network (WAN) module, or a Value Added Network (VAN) module, as well as various cable communication modules such as a Universal Serial Bus (USB), a High Definition Multimedia Interface (HDMI), a Digital Visual Interface (DVI), RS-232 (recommended standard232), power line communication, or a plain old telephone service (POTS). The wireless communication module may include a wireless communication module that supports various wireless communication methods such as a WiFi module, a Wireless broadband module, and a GSM (global System for Mobile Communication), CDMA (Code Division Multiple Access), WCDMA (Wideband Code Division Multiple Access), UMTS (universal mobile telecommunications system), TDMA (Time Division Multiple Access), LTE (Long Term Evolution), 4G, 5G, and 6G.

The memory 120 may store data on an algorithm for controlling the operation of components within the device or a program that reproduces the algorithm. The processor 130 may perform the above-described operation using the data stored in the memory 120. Here, the memory 120 and the processor 130 may be implemented as separate chips. In addition, the memory 120 and the processor 130 may be implemented as a single chip.

The memory 120 may store data supporting various functions of the device, programs for the operation of components within the device, may store input/output data, and may store a plurality of application programs (or applications) executed on the device, data for the operation of the device, and commands. At least some of these application programs may be downloaded from an external server via wireless communication.

The memory 120 may include at least one type of storage medium among a flash memory type, a hard disk type, an SSD type (Solid State Disk type), an SDD type (Silicon Disk Drive type), a multimedia card micro type, a card type memory (for example, an SD or XD memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk. In addition, the memory 120 may be a database that is separate from the device but connected by wire or wirelessly.

The memory 120 may store data related to ultrasound image monitoring. The processor 130 may control an operation related to the ultrasound image monitoring.

In the case that the processor 130 receives an ultrasound ON signal from the ultrasound generation device 10 during an ultrasound ON period through the communication unit 110, the processor 130 may receive a first ultrasound image from the ultrasound image acquisition device 20 through the communication unit 110. In the case that the processor 130 receives an ultrasound OFF signal from the ultrasound generation device 10 during an ultrasound OFF period through the communication unit 110, the processor 130 may receive a second ultrasound image from the ultrasound image acquisition device 20 through the communication unit 110.

At this time, in the case that the processor 130 receives the ultrasound OFF signal from the ultrasound generation device 10 during the ultrasound OFF period, the processor 130 may separate and receive the second ultrasound image from the ultrasound image acquisition device 20 through different scanning lines. In addition, in the case that the processor 130 receives the ultrasound ON signal from the ultrasound generation device 10 during the ultrasound ON period, the processor 130 may simultaneously receive the first ultrasound image from the ultrasound image acquisition device 20 through the same scanning lines. Here, the first ultrasound image and the second ultrasound image may be the same or different from each other. For example, the first ultrasound image may be an image of the periphery of the target area being irradiated with ultrasound, and the second ultrasound image may be an image of the target area irradiated with ultrasound.

The processor 130 may display at least one of the first ultrasound image and the second ultrasound image on the display unit 140. For example, the display unit 140 may display the first ultrasound image corresponding to the image of the periphery of the target area being irradiated with ultrasound, and the second ultrasound image corresponding to the image of the target area irradiated with ultrasound.

At this time, the display unit 140 may be a monitor or a display module. Meanwhile, the display unit 140 may be provided in the ultrasound generation device 10 or the ultrasound image acquisition device 20.

Figure 3:
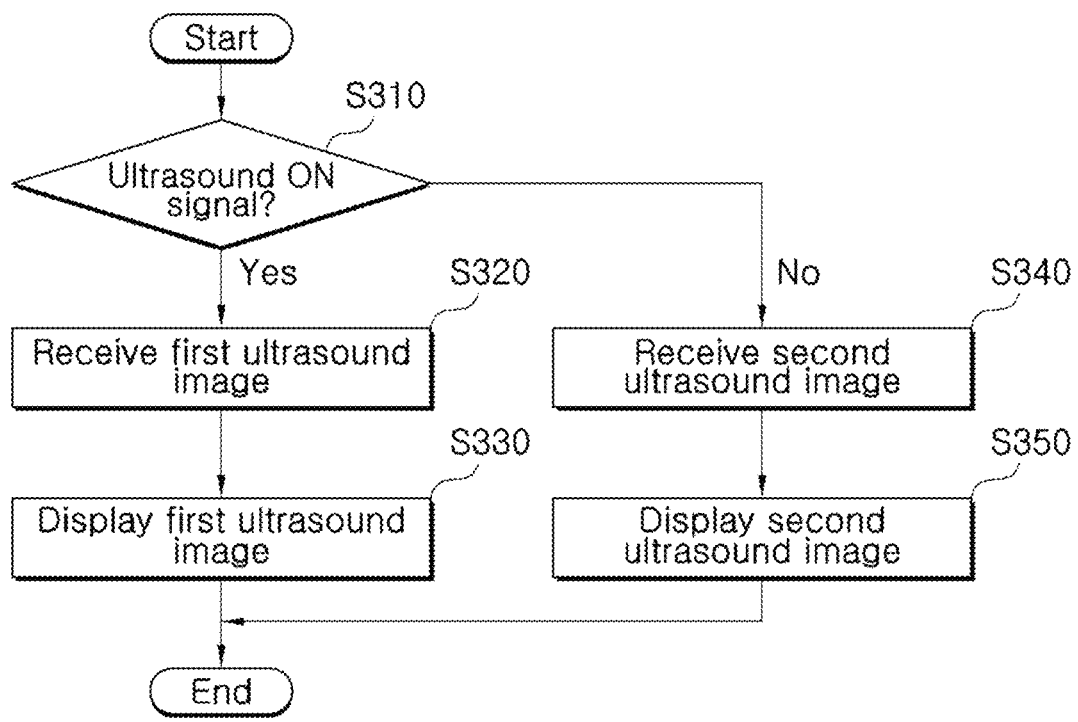
FIG. 3 is a flowchart illustrating an ultrasound image monitoring method according to the present disclosure.
Figure 4:
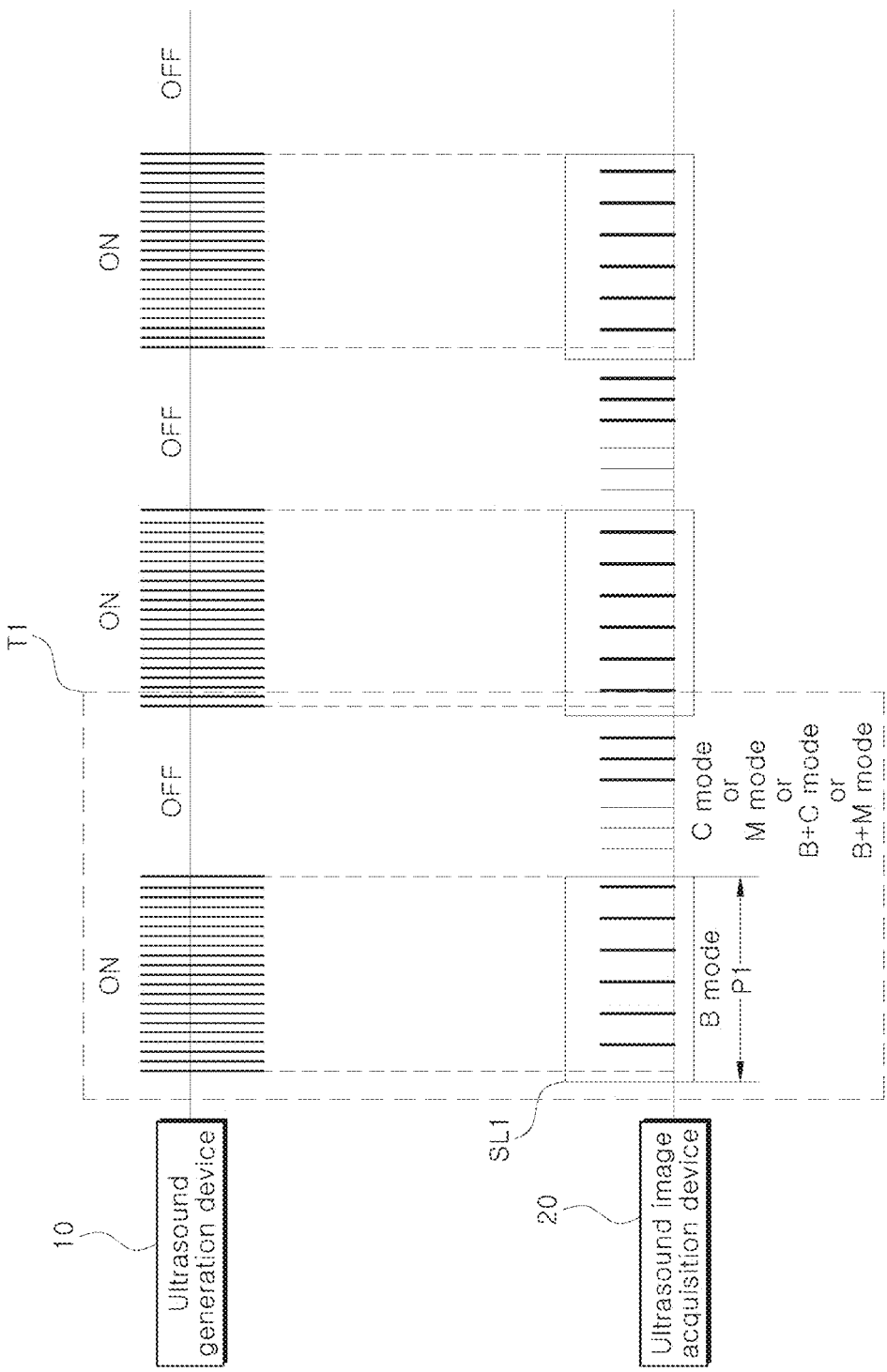
FIG. 4 is a diagram illustrating an example of a process for receiving a first ultrasound image during an ultrasound ON period through the processor of FIG. 1.

FIG. 3 is a flowchart illustrating an ultrasound image monitoring method according to the present disclosure. FIG. 4 is a diagram illustrating an example of a process for receiving a first ultrasound image during an ultrasound ON period through the processor of FIG. 1.

Figure 5:
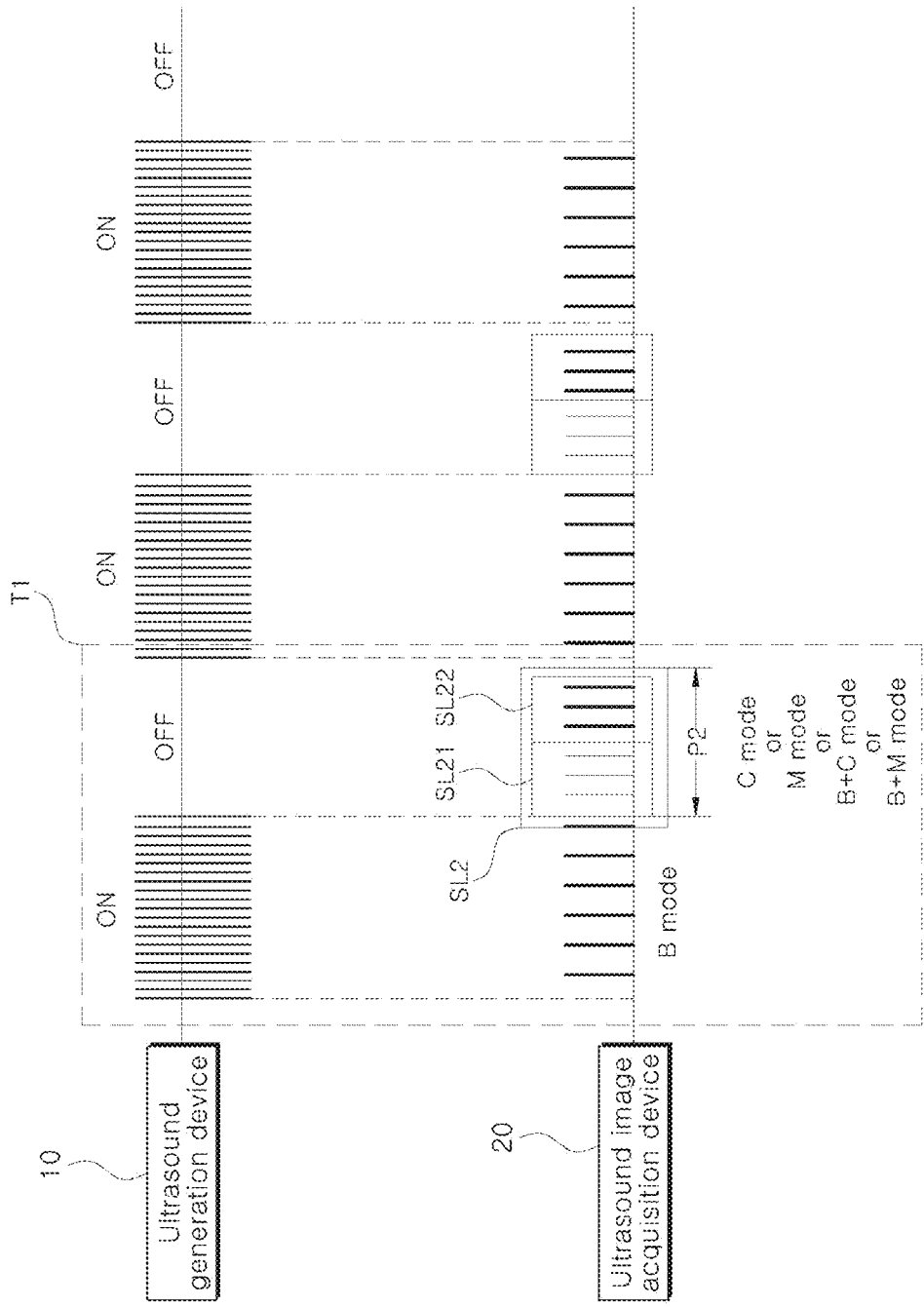
FIG. 5 is a diagram illustrating an example of a process for receiving a second ultrasound image during an ultrasound OFF period through the processor of FIG. 1.
Figure 6:
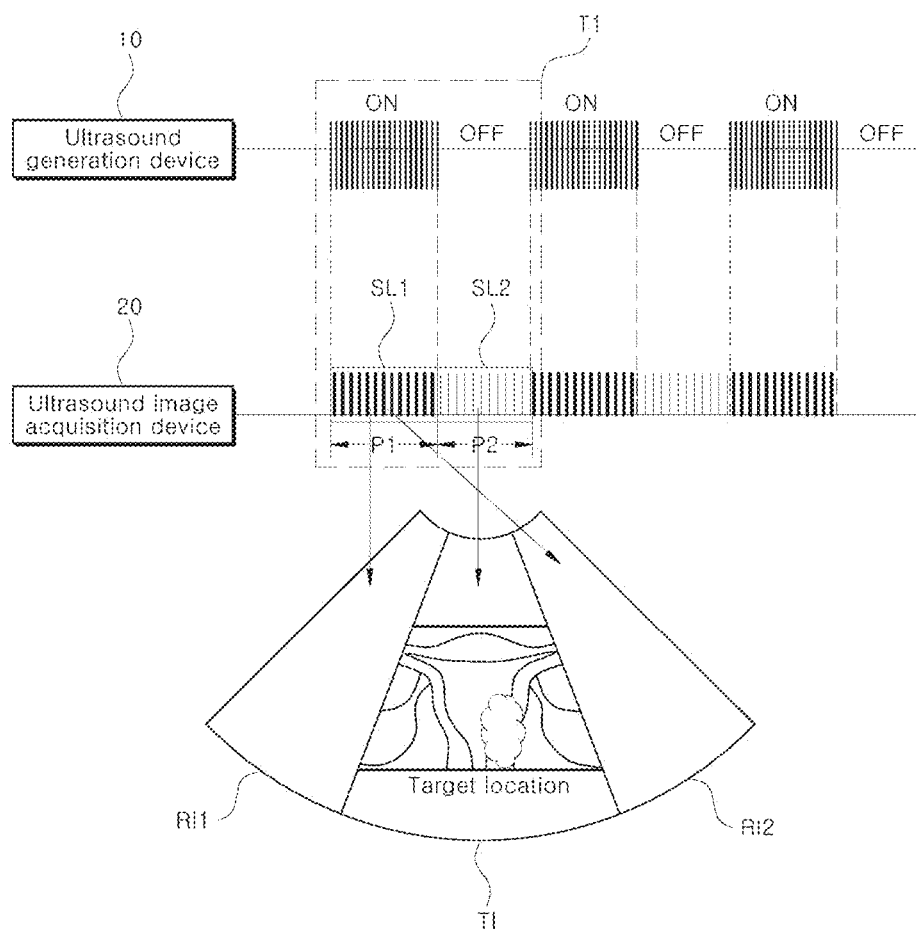
FIG. 6 is a diagram illustrating an example of a process for displaying a first ultrasound image acquired during an ultrasound ON period and a second ultrasound image acquired during an ultrasound OFF period through the processor of FIG. 1.

FIG. 5 is a diagram illustrating an example of a process for receiving a second ultrasound image during an ultrasound OFF period through the processor of FIG. 1. FIG. 6 is a diagram illustrating an example of a process for displaying a first ultrasound image acquired during an ultrasound ON period and a second ultrasound image acquired during an ultrasound OFF period through the processor of FIG. 1.

Referring to FIG. 3, the ultrasound image processing method may include a determination step S310, a first receiving step S320, a first display step S330, a second receiving step S340, and a second display step S350.

The processor 130 may determine whether an ultrasound ON signal is received from the ultrasound generation device 10 during the ultrasound ON period (step S310).

In the case that the processor 130 receives an ultrasound ON signal from the ultrasound generation device 10 during an ultrasound ON period, the processor 130 may receive a first ultrasound image from the ultrasound image acquisition device 20 through the communication unit 110 (step S320). Here, in the case that the processor 130 receives the ultrasound ON signal from the ultrasound generation device 10 during the ultrasound ON period, the processor 130 may receive the first ultrasound image from the ultrasound image acquisition device 20 through the same scanning line at once. For example, the first ultrasound image may be an image of a periphery of a target area being irradiated with ultrasound.

For example, as illustrated in FIG. 4, the processor 130 may receive the first ultrasound image from the ultrasound image acquisition device 20 through the communication unit 110 during the ultrasound ON period P1 to acquire an image frame for one period T1. At this time, the first ultrasound image may be an ultrasound image of B (Brightness) mode that is durable against external signals. That is, B mode is a mode that expresses the size of the signal as brightness, and is less affected by external noise than other modes.

Here, the processor 130 may utilize an array converter of the ultrasonic probe to construct a cross-sectional image in B mode. At this time, the processor 130 may sequentially transmit and receive ultrasound images in all scanning line directions constituting the cross-section based on the array converter, acquire ultrasound images of B mode through the signal processing unit in an echo processing unit of B mode, scan-convert the acquired ultrasound images of B mode through the scan conversion unit, and display the converted ultrasound images of B mode on the display unit 140. At this time, the processor 130 may receive the first ultrasound images simultaneously through the same scanning line SL1 from the ultrasound image acquisition device 20. For example, the first ultrasound image may be an image of the periphery of the target area under ultrasound irradiation. The processor 130 may control the display unit 140 to display the first ultrasound image (step S330). For example, the processor 130 may control the display unit 140 to display the first ultrasound image corresponding to the image of the periphery of the target area under ultrasound irradiation.

For example, as illustrated in FIG. 6, the processor 130 may display, on the display unit 140, images RI1 and RI2 of the periphery of the target area under ultrasound irradiation corresponding to the first ultrasound image received through the scanning line SL1 during the ultrasound ON period P1 among the image frames during one period T1. At this time, the images RI1 and RI2 of the periphery may be the first ultrasound image of B (Brightness) mode that is durable against external signals.

In the case that the processor 130 receives the ultrasound OFF signal from the ultrasound generation device 10 during the ultrasound OFF period, the processor 130 may receive the second ultrasound image from the ultrasound image acquisition device 20 through the communication unit 110 (step S340). Here, in the case that the processor 130 receives the ultrasound OFF signal from the ultrasound generation device 10 during the ultrasound OFF period, the processor 130 may receive the second ultrasound image through different scanning lines from the ultrasound image acquisition device 20. For example, the second ultrasound image may be the image of the target area irradiated with ultrasound.

As an example, as shown in FIG. 5, the processor 130 may receive the second ultrasound image from the ultrasound image acquisition device 20 through the communication unit 110 during the ultrasound OFF period P2 to obtain an image frame for one period T1. At this time, the second ultrasound image may be an ultrasound image including a signal with high sensitivity for detecting blood flow. For example, a signal with high sensitivity for detecting blood flow may be at least one of C (color), M (motion), PD (power doppler), PW (pulsed wave doppler). In this case, since C, M, PD, and PW are very small signals, their sensitivity is very high, so that the ultrasound signal of the ultrasound generation device 10 may be induced and may appear as noise in the ultrasound image acquisition device 20. In this case, the noise refers to a state in which the transmission signal of the ultrasound appears irregularly when the ultrasound is irradiated through the ultrasound generation device 10.

Therefore, in the present disclosure, the second ultrasound image may be provided as an ultrasound image of C (color) mode or M (motion) mode or B (brightness)+C (color) mode, or B (brightness)+M (motion) mode. At this time, B+C mode may be a mode in which B mode and C mode are supported simultaneously, and B+M mode may be a mode in which B mode and M mode are supported simultaneously.

Here, the processor 130 may receive the second ultrasound image of C mode or the second ultrasound image of M mode or the second ultrasound image of B+C mode, or the second ultrasound image of B+M mode through the scan line SL2.

At this time, the processor 130 may separate and receive the second ultrasound image through different scan lines SL21 and SL22. For example, the processor 130 may receive the ultrasound image of C mode through the first scan line SL21 and separate and receive an ultrasound image of B mode through the second scan line SL22. For another example, the processor 130 may receive the ultrasound image of M mode through the first scan line SL21 and separate and receive the ultrasound image of B mode through the second scan line SL22. For another example, the processor 130 may receive the ultrasound image of C mode through the first scan line SL21 and may separately receive the ultrasound image of M mode through the second scan line SL22. Here, the processor 130 may transmit and receive the second ultrasound image of C mode or the second ultrasound image of M mode or the second ultrasound image of B+C mode, or the second ultrasound image of B+M mode through different scan lines SL21 and SL22 and perform signal processing. At this time, the processor 130 may transmit and receive the second ultrasound image of C mode or the second ultrasound image of M mode and perform Doppler signal processing.

In the case of C mode or M mode, since the processor 130 has a very high signal sensitivity, the ultrasound signal of the ultrasound generation device 10 is induced, so in order to prevent it from being seen as noise in the ultrasound image acquisition device 20, the second ultrasound image of B mode and the second ultrasound image of C mode or the second ultrasound image of B mode and the second ultrasound image of M mode may be separately acquired through different scan lines SL21 and SL22 during the ultrasound OFF period P2. For example, the second ultrasound image is the image of the target area irradiated with ultrasound.

The processor 130 may control the display unit 140 to display the second ultrasound image (step S350). For example, the processor 130 may control the display unit 140 to display the second ultrasound image corresponding to the image of the target area irradiated with ultrasound.

As an example, as shown in FIG. 6, the processor 130 may display the image T1 of the target area irradiated with ultrasound corresponding to the second ultrasound image received through the scanning line SL2 during the ultrasound OFF period P2 among the image frames during one period T1 on the display unit 140. At this time, the image T1 of the target area may be the second ultrasound image of C mode, the second ultrasound image of M mode, the second ultrasound image of B+C mode, or the second ultrasound image of B+M mode, which includes a signal with high sensitivity for detecting blood flow without noise.

In this way, the present disclosure may identify the location where the ultrasound is focused and the process of tumor degeneration during ultrasound irradiation using an image, and prevent safety accidents through the image identification.

At least one component may be added or deleted in accordance with the performance of the components illustrated in FIG. 1, FIG. 2, and FIGS. 4 to 6. In addition, it will be readily understood by those skilled in the art that the reciprocal positions of the components may be changed in accordance with the performance or structure of the system.

Although FIG. 3 describe sequential execution of the multiple steps, this is merely an exemplary implementation, and it will be appreciated that the order described in FIG. 3 may be modified without departing from the principles of the present embodiment. For example, one or more of the multiple steps may be executed in parallel, and FIG. 3 is not limited to a sequential order.

Meanwhile, the disclosed embodiments may be implemented in the form of a non-transitory recording medium that stores instructions executable by a computer. The instructions may be stored in the form of program codes, and when executed by a processor, may generate a program module to perform the operations of the disclosed embodiments. The recording medium may be implemented as a computer-readable recording medium.

The non-transitory computer-readable recording medium includes all types of recording media that store instructions that can be decoded by a computer. For example, there may be a ROM (Read Only Memory), a RAM (Random Access Memory), a magnetic tape, a magnetic disk, a flash memory, an optical data storage device, and the like.

The disclosed embodiments have been described with reference to the attached drawings as described above. It will be appreciated that the present disclosure can be implemented in a form other than the disclosed embodiments without departing from the principles of the present disclosure. The disclosed embodiments are exemplary and should not be construed as limiting.

What is claimed is:

1. An ultrasonic treatment and monitoring system, comprising:
   an ultrasonic treatment device configured to emit ultrasonic waves to treat a patient;
   an ultrasound image acquisition device configured to obtain an ultrasound image; and
   a control device, wherein the control device is configured to:
      determine that the ultrasonic treatment device is on;
      based on the ultrasonic treatment device being on, control the ultrasound image acquisition device to acquire a first ultrasound image;
      determine that the ultrasonic treatment device is off;
      based on the ultrasonic treatment device being off, control the ultrasound image acquisition device to acquire a second ultrasound image; and
      cause the first ultrasound image and/or the second ultrasound image to be displayed on a display;
   wherein the second ultrasound image corresponds to a target imaging area corresponding to a treatment area of the patient, and the first ultrasound image corresponds to one or more peripheral areas adjacent to the target imaging area.

2. The ultrasonic treatment and monitoring system according to claim 1, wherein the ultrasound image acquisition device is configured to utilize a plurality of scanning lines for acquiring the first and second ultrasound images, wherein the first ultrasound image corresponds to a first set of scanning lines, and the second ultrasound image corresponds to a second set of scanning lines.

3. The ultrasonic treatment and monitoring system according to claim 1, wherein the first and second ultrasound images are of different imaging areas.

4. The ultrasonic treatment and monitoring system according to claim 1, wherein the second ultrasound image includes color (C), motion (M), power Doppler (PD), and/or pulsed wave (PW) Doppler information.

5. A method for monitoring an ultrasonic treatment, comprising:
  determining, by an ultrasonic treatment and monitoring system, that an ultrasonic treatment device is on;
  based on the ultrasonic treatment device being on, acquiring, via an ultrasound image acquisition device of the ultrasound treatment and monitoring system, a first ultrasound image;
  determining, by the ultrasonic treatment and monitoring system, that the ultrasonic treatment device is off;
  based on the ultrasonic treatment device being off, acquiring, via the ultrasound image acquisition device, a second ultrasound image; and
  displaying, by the ultrasonic treatment and monitoring system, the first ultrasound image and/or the second ultrasound image on a display;
  wherein the second ultrasound image corresponds to a target imaging area corresponding to a treatment area of a patient, and the first ultrasound image corresponds to one or more peripheral areas adjacent to the target imaging area.

6. The method according to claim 5, wherein the ultrasound image acquisition device utilizes a plurality of scanning lines for acquiring the first and second ultrasound images, wherein the first ultrasound image corresponds to a first set of scanning lines, and the second ultrasound image corresponds to a second set of scanning lines.

7. The method according to claim 5, wherein the first and second ultrasound images are of different imaging areas.

8. The method according to claim 5, wherein the second ultrasound image includes color (C), motion (M), power Doppler (PD), and/or pulsed wave (PW) Doppler information.

9. One or more non-transitory computer-readable mediums having processor-executable instructions stored thereon, wherein the processor-executable instructions, when executed, facilitate performance of the following by an ultrasonic treatment and monitoring system:
  determining that an ultrasonic treatment device is on;
  based on the ultrasonic treatment device being on, acquiring, via an ultrasound image acquisition device of the ultrasound treatment and monitoring system, a first ultrasound image;
  determining that the ultrasonic treatment device is off;
  based on the ultrasonic treatment device being off, acquiring, via the ultrasound image acquisition device, a second ultrasound image; and
  displaying the first ultrasound image and/or the second ultrasound image on a display;
  wherein the second ultrasound image corresponds to a target imaging area corresponding to a treatment area of a patient, and the first ultrasound image corresponds to one or more peripheral areas adjacent to the target imaging area.

10. The one or more non-transitory computer-readable mediums according to claim 9, wherein the ultrasound image acquisition device is configured to utilize a plurality of scanning lines for acquiring the first and second ultrasound images, wherein the first ultrasound image corresponds to a first set of scanning lines, and the second ultrasound image corresponds to a second set of scanning lines.

11. The one or more non-transitory computer-readable mediums according to claim 9, wherein the first and second ultrasound images are of different imaging areas.

12. The one or more non-transitory computer-readable mediums according to claim 9, wherein the second ultrasound image includes color (C), motion (M), power Doppler (PD), and/or pulsed wave (PW) Doppler information.

* * * * *